R. F. BLOOM.
WHIFFLETREE HOOK.
APPLICATION FILED JAN. 27, 1909.
942,431.
Patented Dec. 7, 1909.
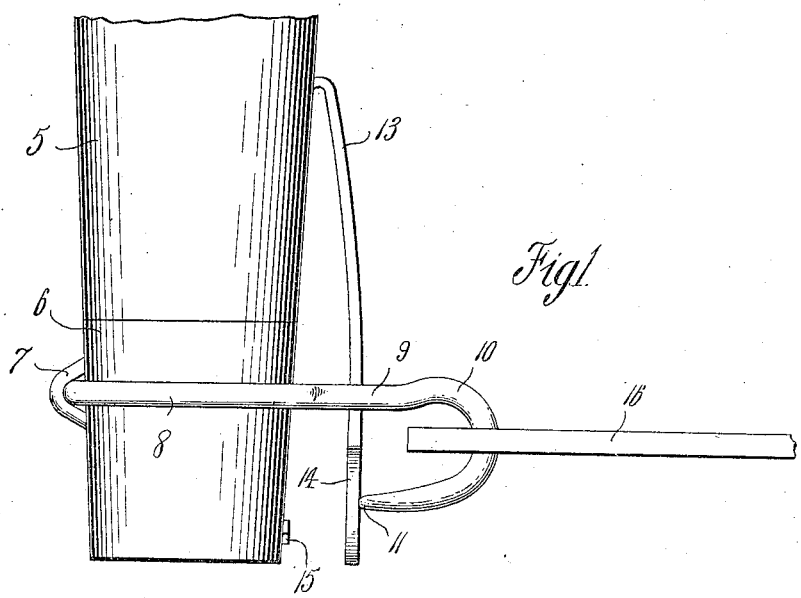
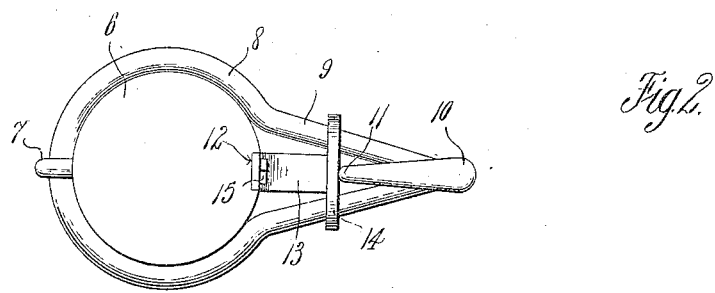
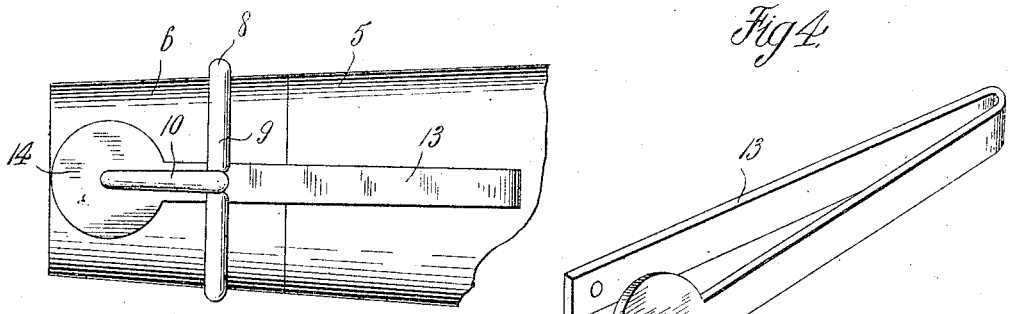
Witnesses
J. H. Crawford
W. T. Miller.
Inventor
Robert F. Bloom,
By
Attorneys

UNITED STATES PATENT OFFICE.

ROBERT F. BLOOM, OF STARBUCK, MINNESOTA.

WHIFFLETREE-HOOK.

942,431. Specification of Letters Patent. Patented Dec. 7, 1909.

Application filed January 27, 1909. Serial No. 474,555.

*To all whom it may concern:*

Be it known that I, ROBERT F. BLOOM, a citizen of the United States, residing at Starbuck, in the county of Pope, State of Minnesota, have invented certain new and useful Improvements in Whiffletree-Hooks; and I do hereby declare the following to be a full, clear, and exact description of the invention, such as will enable others skilled in the art to which it appertains to make and use the same.

The invention relates to a whiffletree hook and more particularly to the class of safety whiffletree hooks.

The primary object of the invention is the provision of a whiffletree hook in which a trace may be easily and quickly attached and retained against accidental detachment in a reliable manner on the hook.

Another object of the invention is the provision of a whiffletree hook in which a cock-eye is loosely connected to a ferrule mounted upon one extremity of a whiffletree so as to permit the ready and easy attachment of a trace to the cock eye, and means such as a spring adapted to close the hook extremity of the cock-eye so as to retain in a reliable manner the trace connected thereto and thereby overcome any possibility of its detachment although permitting the same to be readily and quickly detached when unhitching the draft animal from a vehicle.

A further object of the invention is the provision of a whiffletree hook which is simple in construction, thoroughly reliable and efficient in operation, durable, and inexpensive in the manufacture.

With these and other objects in view the invention consists in the construction, combination and arrangement of parts as will be hereinafter more fully described, in detail, illustrated in the accompanying drawings which disclose the preferred form of embodiment of the invention to enable those skilled in the art to practice the same and as brought out in the claim hereunto appended.

In the drawings: Figure 1 is a fragmentary top plan view of a whiffletree with the invention applied thereto and having a trace end connected. Fig. 2 is an end elevation. Fig. 3 is a side elevation. Fig. 4 is a detail perspective view of the spring member detached.

Similar reference characters indicate corresponding parts throughout the several views in the drawings.

In the drawings the numeral 5 designates the whiffletree which is of the usual and conventional form and may be constructed of any suitable material and on the end thereof is mounted a sleeve or ferrule 6 which is preferably constructed of malleable iron although it may be of any size to fit different forms of whiffletrees. The said ferrule 6 is formed with an integral eye 7 through which freely passes a cock eye the latter in the form of a substantially circular open ring 8 the ends of which are bent to form forwardly projecting converging extensions 9 terminating in a single hook extremity 10 the bill 11 of which is substantially parallel with the extensions 9 and spaced therefrom.

At a point diametrically opposite the eye 7 is a groove 12 extending longitudinally of the ferrule 6 and within which groove is seated one end of a flat spring member 13 the latter doubled on itself and having its free extremity passed through the ring 8 and formed with a disk or circular terminal piece 14 the same adapted to abut against the bill 11 of the hook 10 so as to close the latter. The spring member 13 is held seated in the groove by a fastener 15 which latter permits the detachment of the said spring member in event the same should become broken and it is desired to replace it by a new one.

To attach the trace end 16 to the hook 10 it is necessary to press the disk piece 14 of the spring member 13 out of contact and away from the bill 11 of said hook which will permit the said trace end 16 to engage the hook and thereafter the free end of the spring member 13 is released which will close the said hook and retain the trace connected to the latter.

It is obvious that the cock-eye 8 having free connection with the eye 7 formed on the ferrule 6 will permit lateral movement of the said cock eye should any irregularity of pull exist on the trace when connected to the hook.

What is claimed is—

The combination with a whiffletree of a ferrule connected thereto, at one end of the same, an eye formed on said ferrule and projecting from the same rearwardly of the whiffletree, a ring loosely connected in the eye, an open hook formed integral with the ring, the said ring adapted to encircle the ferrule, and a leaf spring having one end fixed to the ferrule and having its opposite end passed through the ring and terminating in a circular bearing extremity and adapted to normally engage the bill of the hook.

In testimony whereof, I affix my signature, in presence of two witnesses.

ROBERT F. BLOOM.

Witnesses:
   GEO. W. HUGHES,
   O. L. TODNES.